(12) United States Patent
Chen

(10) Patent No.: US 8,544,873 B2
(45) Date of Patent: Oct. 1, 2013

(54) CHILD CARRIER APPARATUS AND ITS OPERATING METHOD

(75) Inventor: Rui-bin Chen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 278 days.

(21) Appl. No.: 12/886,733

(22) Filed: Sep. 21, 2010

(65) Prior Publication Data

US 2011/0068549 A1  Mar. 24, 2011

(30) Foreign Application Priority Data

Sep. 24, 2009  (CN) .......................... 2009 1 0178627

(51) Int. Cl.
B62B 7/00 (2006.01)
(52) U.S. Cl.
USPC ........................................ 280/658; 280/47.38
(58) Field of Classification Search
USPC ...... 280/33.993, 47.38, 47.41, 639, 647–650, 280/658, 641–644, 655, 655.1, 47.371
See application file for complete search history.

(56) References Cited

U.S. PATENT DOCUMENTS

| | | | | |
|---|---|---|---|---|
| 4,725,071 A * | 2/1988 | Shamie | .......................... | 280/643 |
| 4,858,947 A * | 8/1989 | Yee et al. | ...................... | 280/643 |
| 5,417,449 A * | 5/1995 | Shamie | .......................... | 280/642 |
| 6,267,406 B1 * | 7/2001 | Huang | .......................... | 280/647 |
| 6,843,498 B2 * | 1/2005 | Bretschger et al. | ........... | 280/642 |
| 7,658,446 B2 * | 2/2010 | Meeker et al. | .............. | 297/250.1 |
| 7,694,996 B2 * | 4/2010 | Saville et al. | .................. | 280/642 |
| 8,029,014 B2 * | 10/2011 | Ahnert et al. | ................. | 280/650 |
| 8,186,705 B2 * | 5/2012 | Greger et al. | ................. | 280/643 |
| 2008/0079293 A1 * | 4/2008 | Hedges et al. | ........... | 297/216.11 |
| 2009/0039620 A1 * | 2/2009 | Ryan et al. | ..................... | 280/647 |
| 2010/0109272 A1 * | 5/2010 | Ahnert et al. | ............. | 280/47.38 |
| 2010/0237589 A1 * | 9/2010 | Haut et al. | .................... | 280/642 |

FOREIGN PATENT DOCUMENTS

| | | |
|---|---|---|
| DE | 202005019191 U1 | 3/2006 |
| EP | 0878375 A1 | 11/1998 |
| EP | 2179908 A2 | 4/2010 |
| GB | 2468796 A | 9/2010 |

* cited by examiner

*Primary Examiner* — John Walters
*Assistant Examiner* — James Triggs
(74) *Attorney, Agent, or Firm* — David I. Roche; Baker & McKenzie LLP

(57) ABSTRACT

A child carrier apparatus having at least two configurations of use. In some embodiments, the child carrier apparatus comprises a support frame, a seat assembly mounted on the support frame and including a front seat frame and a rear seat frame operable to rotate about a pivot axle relative to the front seat frame, and a lock mechanism including a locking element assembled with the rear seat frame and operable to move relative to the rear seat frame between a first and second position. The locking element when in the first position is configured to engage with a portion of the front seat frame for locking the front seat frame with the rear seat frame. In some embodiments, a method of operating the child carrier apparatus is also described.

18 Claims, 6 Drawing Sheets

300# CHILD CARRIER APPARATUS AND ITS OPERATING METHOD

CROSS-REFERENCE TO RELATED APPLICATION

This application claims priority of Chinese application no. 200910178627.5, filed on Sep. 24, 2009.

BACKGROUND OF THE INVENTION

1. Field of the Invention

The present invention relates to a child carrier apparatus and its operating method.

2. Description of the Related Art

An infant stroller can be typically used for transporting an infant in a convenient manner. Because the adult pushes the infant stroller from the rear side, the child seated in the infant stroller generally cannot see the adult. This may be disadvantageous as the sight of a familiar face may comfort the child. To overcome this issue, certain manufacturers have developed infant strollers provided with a backrest that can be adjustable toward the rear or front of the stroller for either forward or rearward configurations of use. More specifically, when the backrest is inclined forward, the child can be seated facing the rear of the stroller. When the backrest is inclined rearward, the child can be seated facing the front of the stroller. Because this approach requires a seat of a larger size, the adult may erroneously place the child on the front or rear portion of the seat while the stroller is not configured to the adequate orientation. For example, the adult may have the child seat on the rear portion of the seat while the stroller is in the forward configuration of use, or reciprocally. Such misuse may cause overload, and affect the safety of the stroller.

Therefore, there is a need for an improved design that is convenient to operate and can address at least the foregoing safety issues.

SUMMARY

The present application describes a child carrier apparatus having at least two configurations of use. In some embodiments, the child carrier apparatus comprises a support frame, a seat assembly mounted on the support frame and including a front seat frame and a rear seat frame operable to rotate about a pivot axle relative to the front seat frame, and a lock mechanism including a locking element assembled with the rear seat frame and operable to move relative to the rear seat frame between a first and second position. The locking element when in the first position is configured to engage with a portion of the front seat frame for locking the front seat frame with the rear seat frame.

In other embodiments, the present application also describes a method of operating a child carrier apparatus. In some embodiment, the method comprises rotating the backrest to a position inclined toward the front seat, rotating the rear seat about the pivot axle to a seating position, and driving the locking element in movement to engage with a portion of the front seat for locking the front seat with the rear seat in a rearward configuration of use.

At least one advantage of the structures and methods described herein is the ability to provide a rotary rear seat, and a lock mechanism that can create selective interference between the rear seat and the backrest. Erroneous use of the rear and front seat can be thereby prevented effectively. As a result, the child carrier apparatus can be safer in use.

DETAILED DESCRIPTION OF THE EMBODIMENTS

The present application describes a child carrier apparatus and its operating method. The child carrier apparatus includes a seat assembly including a front seat and a rear seat operable to rotate relative to the front seat, and an adjustable backrest connected with the seat assembly via at least one position adjustment device. A lock mechanism is also assembled between the front and rear seat for selectively locking the rear seat with the front seat. The child carrier apparatus can be adjusted between a forward and rearward configuration of use by operating the backrest and the lock mechanism. When the child carrier apparatus is in the forward configuration of use, the rear seat is inclined to a position that cannot accept the placement of the child, whereby erroneous use of the rear seat can be prevented. When the child carrier apparatus is in the rearward configuration of use, the backrest is inclined forward such that the backrest and the front seat form an angle that cannot accept the placement of the child, whereby erroneous use of the front seat can be prevented. The features described herein can be applied to any types of child carrier apparatus including, without limitation, stroller apparatuses, child seats, and the like.

Figure 1:
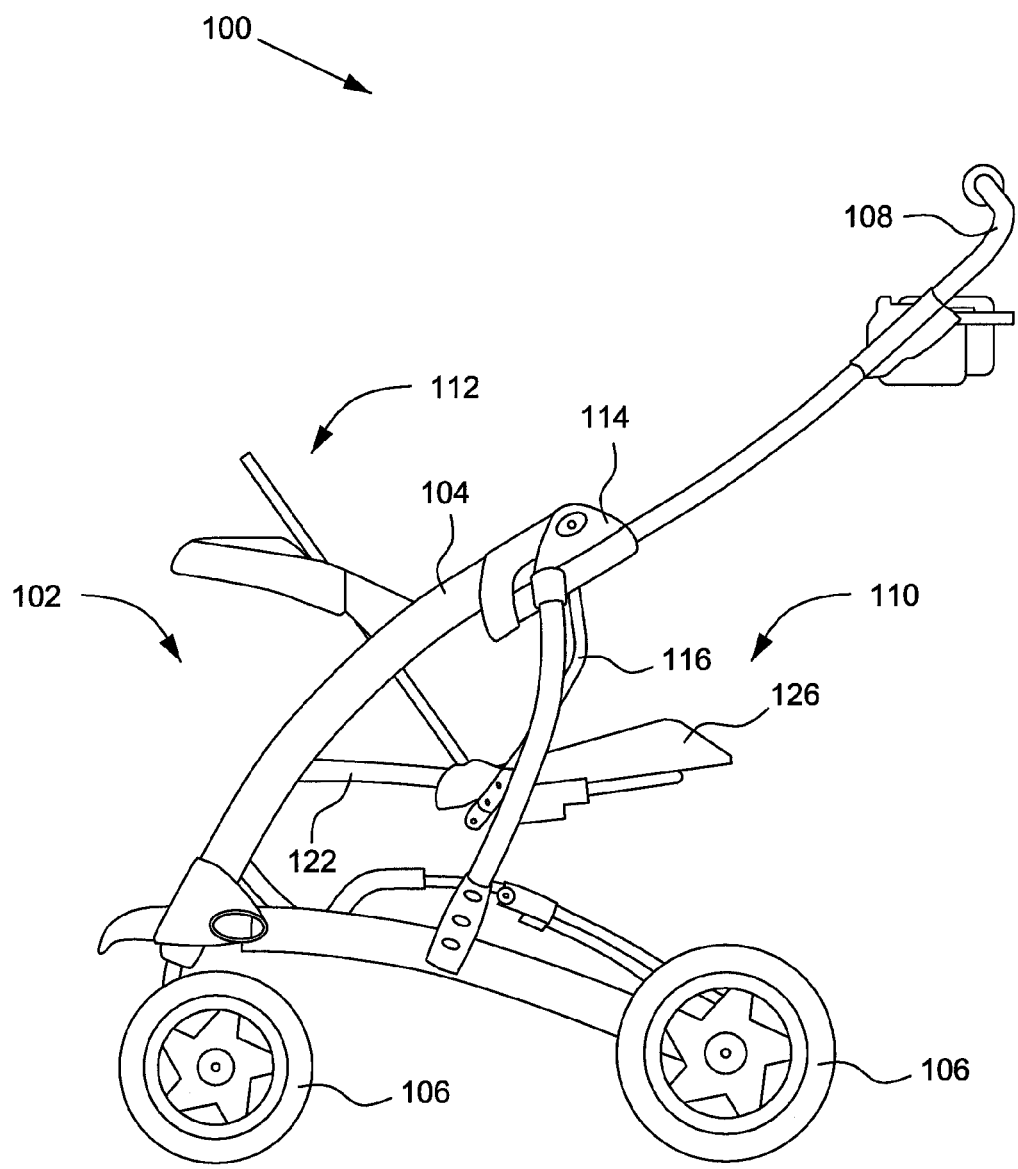
FIG. 1 is a schematic view illustrating a stroller embodiment of a child carrier apparatus having two configurations of use.

FIG. 1 is a schematic view illustrating a stroller embodiment of a child carrier apparatus 100 having a forward and rearward configuration of use. The child carrier apparatus 100 can include a support frame 102 having a plurality of tubes 104 extending on the left and right sides, a plurality of wheels 106, a U-shaped handle 108, a seat assembly 110 and a backrest 112. According to one embodiment, the tubes 104 can be connected with left and right ends of the handle 108 via hinges 114 so that the support frame 102 can be collapsible for convenient storage. Link elements 116 are provided for connecting left and right sides of the seat assembly 110 with the hinges 114. In one embodiment, each of the hinges 114 can also include a latching device (not shown) that is coupled via a cable or the like with a release button (not shown) provided on the handle 108. Such latching device can fasten the handle 108 with the tubes 104 to lock the support frame 102 in a deployed or unfolded configuration. When the release button is operated, the latching device can unfasten the connection between the handle 108 and the tubes 104, such that the handle 108 can be pushed to cause the support tubes 104 and link elements 116 to fold downward for collapsing the support frame 102 into a compact form.

Figure 2:
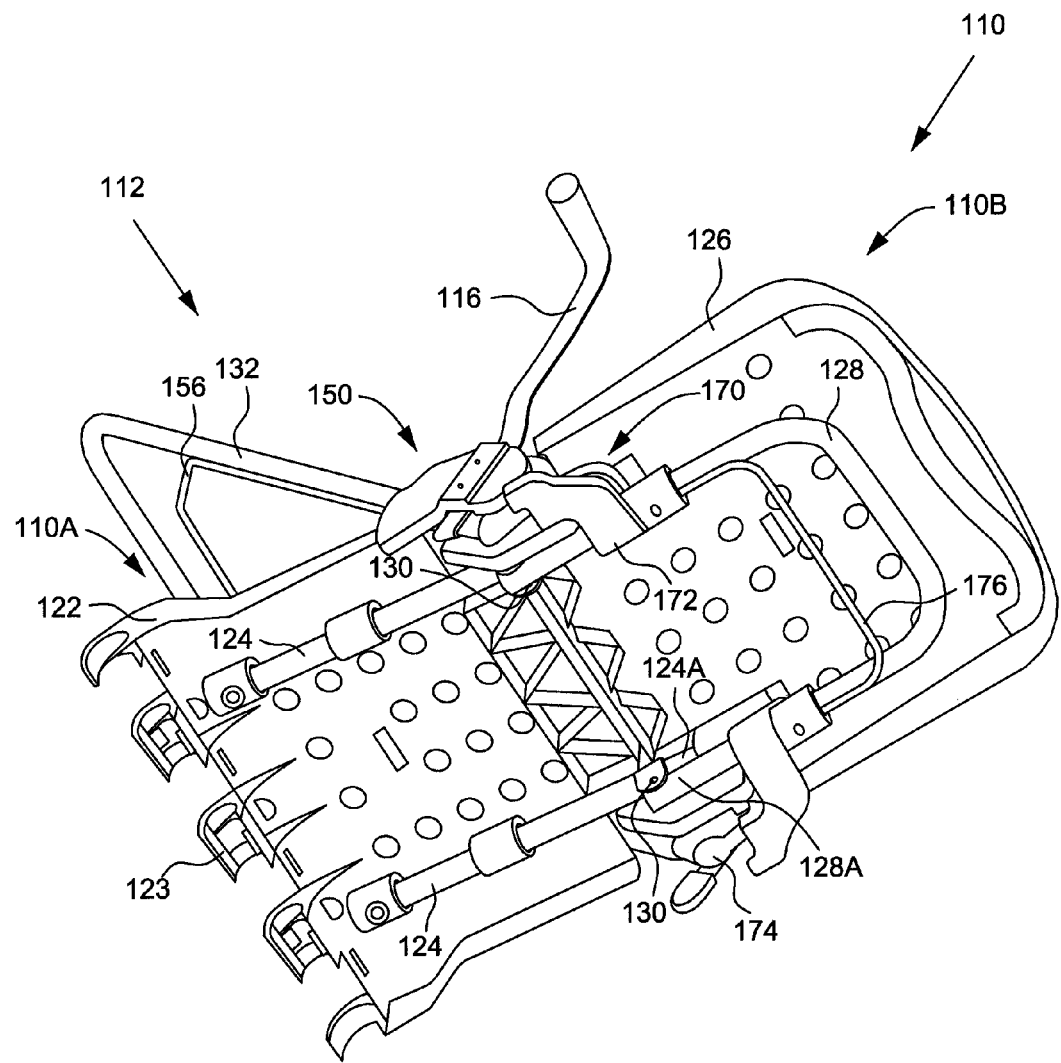
FIG. 2 is a schematic view illustrating the assembly of a seat assembly with a backrest in the child carrier apparatus shown in FIG. 1.

FIG. 2 is a schematic view illustrating the construction of the seat assembly 110 and the backrest 112. The seat assembly 110 can include a front portion 110A and a rear portion 110B. The front portion 110A may comprise a front seat frame 124 provided with a front seat 122. In one embodiment, the front seat frame 124 can be formed from a tubular structure affixed below the front seat 122. The rear portion 110B may comprise a rear seat frame 128 provided with a rear seat 126. The rear seat frame 128 can also be formed from a tubular structure affixed below the rear seat 126. In the illustrated embodiment, both of the front and rear seat 122 and 126 can include seat boards made of rigid materials (e.g., plastics, metals, and the like). In alternate embodiments (not shown), rather than using rigid seat boards, flexible materials (such as fabrics) can also be stretched and attached with the front and rear seat frame 124 and 128 to form the front and rear seats. The front seat 122 can have a top surface inclined at an angle so as to provide comfortable seating position to a child. Moreover, a front edge of the front seat 122 can include a fastening element 123 through which a front end of the seat assembly 110 can be securely assembled with a transversal bar (not shown) joining the left and right tubes 104 of the support frame 102. In one embodiment, the rear seat frame 128 can have a U-shape adapted to provide support for the rear seat 126 and operable to rotate about a pivot axle 130 relative to the front seat frame 124. The rear portion 110B of the seat assembly 110 can be thereby adjustable relative to the front portion 110A of the seat assembly 110 to turn the child carrier apparatus 100 to either of the forward and rear configuration of use.

As shown in FIG. 2, the backrest 112 can include a tubular backrest frame 132 having a generally U-shape and adapted to provide support for a back cushion (not shown). Left and right sides of the backrest frame 132 are respectively coupled with the pivot axles 130, such that the backrest 112 can be pivotally adjusted forward and rearward relative to the seat assembly 110. Each of the left and right sides of the backrest frame 132 is also provided with a position adjustment device 150 operable to adjust and hold the backrest 112 at different inclinations. In addition, a lock mechanism 170 is provided between the front seat frame 124 and the rear seat frame 128. The lock mechanism 170 is operable to selectively lock the front seat frame 124 with the rear seat frame 128, and selectively block rotational movements of the backrest 112 relative to the seat assembly 110.

Figure 3:
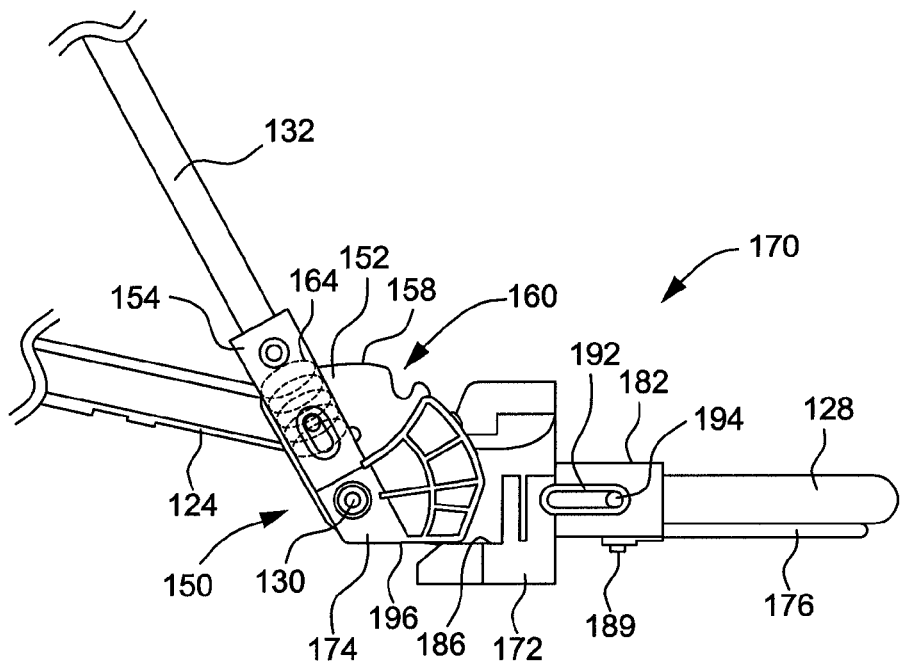
FIG. 3 is a schematic side view illustrating a position adjustment device and lock mechanism of the child carrier apparatus shown in FIG. 1.
Figure 4:
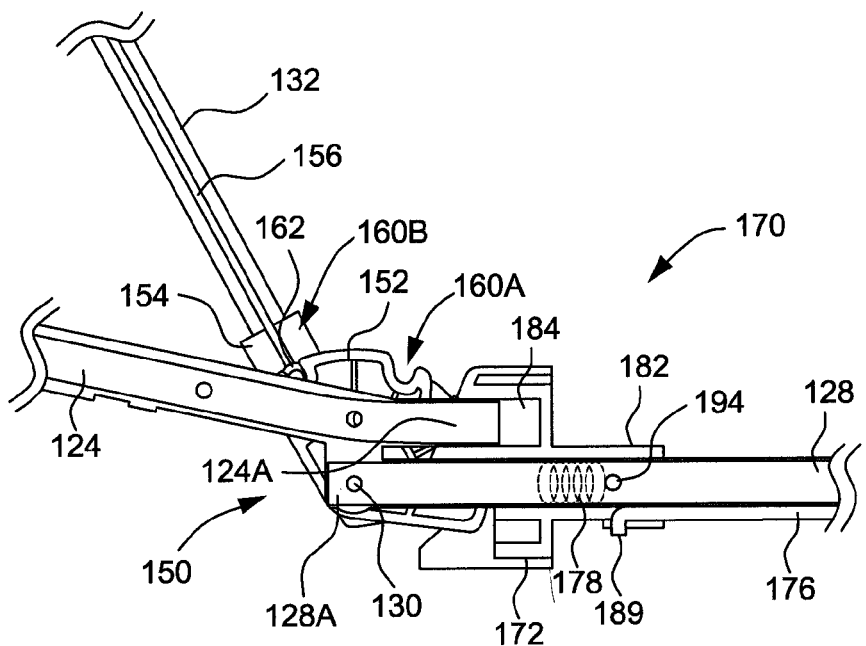
FIG. 4 is a partial cross-sectional view illustrating the position adjustment device and lock mechanism.

FIGS. 3 and 4 are schematic views showing in more details the position adjustment device 150 and lock mechanism 170. For the sake of clarity, the front and rear seat 122 and 126 are omitted from FIGS. 3 and 4 for more clearly showing the construction of the position adjustment device 150 and lock mechanism 170. As shown, the position adjustment device 150 can include a holder plate 152, a latch element 154, and a cable 156 connected with the latch element 154.

The holder plate 152 can be affixed on the front seat frame 124 (or support frame 102). An upper edge portion 158 of the holder plate 152 can have an arc shape provided with a plurality of grooves 160 at different radial directions. The grooves 160 can include a first groove 160A for holding the backrest 112 in a position inclined rearward (corresponding to a forward configuration of use), and a second groove 160B for holding the backrest 112 in a position inclined forward (corresponding to a rearward configuration of use).

The latch element 154 can be formed as a generally cylindrical sleeve. The latch element 154 is mounted movably on a lower end of the backrest frame 132 adjacent to one side of the holder plate 152. A middle section of the latch element 154 can include a protruding key 162 that projects in a lateral direction toward the holder plate 152 and can engage with or disengage from any of the grooves 160 as the latch element 154 is driven in downward or upward translational movements relative to the backrest frame 132.

The interior of the latch element 154 can be mounted with a spring element 164. The spring element 164 can act to bias the latch element 154 in a downward direction that urges the key 162 against the upper edge portion 158 of the holder plate 152, or to engage with one of the grooves 160 depending on the inclination of the backrest 112. When it is operated, the cable 156 can draw the latch element 154 in upward translational movement relative to the backrest frame 132 to overcome the elastic force exerted by the spring element 164, such that the key 162 can disengage from any of the grooves 160. While the latch element 154 is kept disengaged from the grooves 160, the backrest 112 and backrest frame 132 can be rotated around the pivot axle 130 for adjusting the inclination of the backrest 112. Once the backrest 112 has reached the desired position, the spring element 164 can bias the latch element 154 in a reverse direction and cause the key 162 to engage with a corresponding groove 160 for locking the position of the backrest 112.

Referring again to FIGS. 3 and 4, the lock mechanism 170 comprises a locking element 172, an interference element 174, an actuator handle 176 and a spring element 178. In one embodiment, the locking element 172 and the interference element 174 can be respectively made of rigid materials including, without limitation, plastics, metals, or a combination thereof. The locking element 172 can be movably mounted on the rear portion 110B of the seat assembly 110, for example on the rear seat frame 128. The interference element 174 can be affixed on a distal end of the backrest tubular frame 132 that is proximate to the latch element 154. It is worth noting that the locking element 172 and interference element 174 of the lock mechanism 170 can be provided on one side only (i.e., either of the right or left side), or both sides (i.e., the right and left side) of the seat assembly 110.

Figure 9:
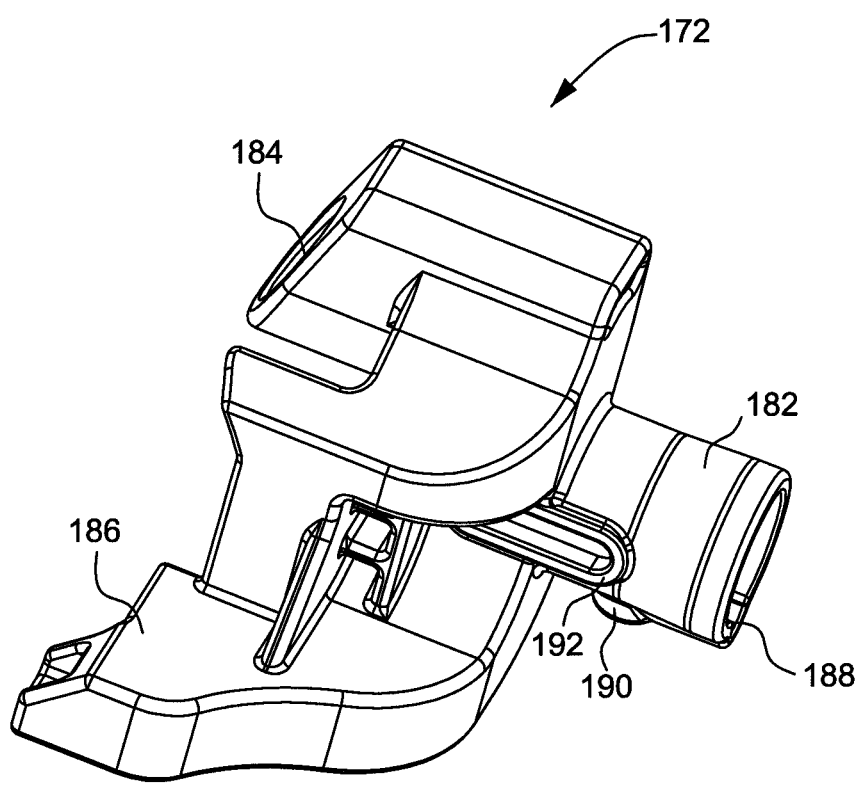
FIG. 9 is a perspective view illustrating a locking element used in the lock mechanism.

FIG. 9 is a perspective view illustrating the structure of the locking element 172 in more details. Referring to FIGS. 3, 4 and 9, the locking element 172 may be formed in a single body, including a first sleeve portion 182, a second sleeve portion 184 and an abuttal surface 186. Rigid materials used for making the locking element 172 can include, without limitation, plastics, metal or the like. The first and second sleeve portion 182 and 184 can be arranged above each other at different heights. In particular, the first sleeve portion 182 can be disposed at a lower position movably assembled with the rear seat frame 128. The second sleeve portion 184 can be disposed above the first sleeve portion 182 at an upper position corresponding to the front seat frame 124. The abuttal surface 186 can be located at one lateral side of the first and second sleeve portion 182 and 184 corresponding to the left (or right) side of the backrest frame 132. In addition, the abuttal surface 186 can be substantially planar and generally parallel to the axes of the first and second sleeve portion 182 and 184.

The spring element 178 is disposed in an interior of the first sleeve portion 182. More specifically, the spring element 178 has a first end connected with the rear seat frame 128, and a second end connected with the locking element 172. The spring element 178 is operable to urge the locking element 172 toward the front seat frame 124, such that the second sleeve portion 184 can engage with a rear end 124A of the front seat frame 124 for locking the front seat frame 124 with the rear seat frame 128 (as also shown in FIG. 4).

The actuator handle 176 can be assembled along a groove 188 formed in an inner surface of the first sleeve portion 182. The actuator handle 176 can include a bent portion 189 that is secured through a hole 190 of the first sleeve portion 182 for affixing the actuator handle 176 with the locking element 172. A side of the first sleeve portion 182 can also include an elongated opening 192 through which a protrusion 194 projecting laterally from the rear seat frame 128 can engage for guiding translational movements of the locking element 172 along the rear seat frame 128 and preventing relative rotational displacements between the locking element and the rear seat frame 128.

Exemplary operation of the seat assembly 110 and backrest 112 is now described with reference to FIGS. 3-7. In FIGS. 3 and 4, the seat assembly 110 and backrest 112 are shown in a rearward configuration of use (i.e., a child can be seated facing the rear of the child carrier apparatus 100). In this configuration, the spring element 178 biases the locking element 172 toward the front seat frame 124, such that the second sleeve portion 184 engages with the rear end 124A of the front seat frame 124. The front seat 122 and the front seat frame 124 are thereby locked with the rear seat 126 and the rear seat frame 128. As better shown in FIG. 2, the rear seat frame 128 can extend along a generally horizontal direction for supporting the rear seat 126. Moreover, each of the latch elements 154 of the backrest frame 132 can correspondingly engage with the second groove 160B of the holder plate 152 for holding the backrest frame 132 in a position inclined toward the front seat 122 (i.e., the angle between the backrest frame 132 and the rear seat frame 128 is greater than the angle between the backrest frame 132 and the front seat frame 124). Moreover, a bottom edge 196 of the interference element 174 is in blocking contact against the abuttal surface 186 of the locking element 172 for blocking rotational movements of the backrest frame 132 and backrest 112 about the pivot axle 130 relative to the seat assembly 110. As a result, even if the latch elements 154 inadvertently disengage from the second grooves 160B, the backrest frame 132 still cannot rotate relative to the seat assembly 110 owing to the interference between the locking element 172 and the interference element 172. Accidental or unwanted rotation of the backrest 112 can be thereby prevented.

Figure 5:
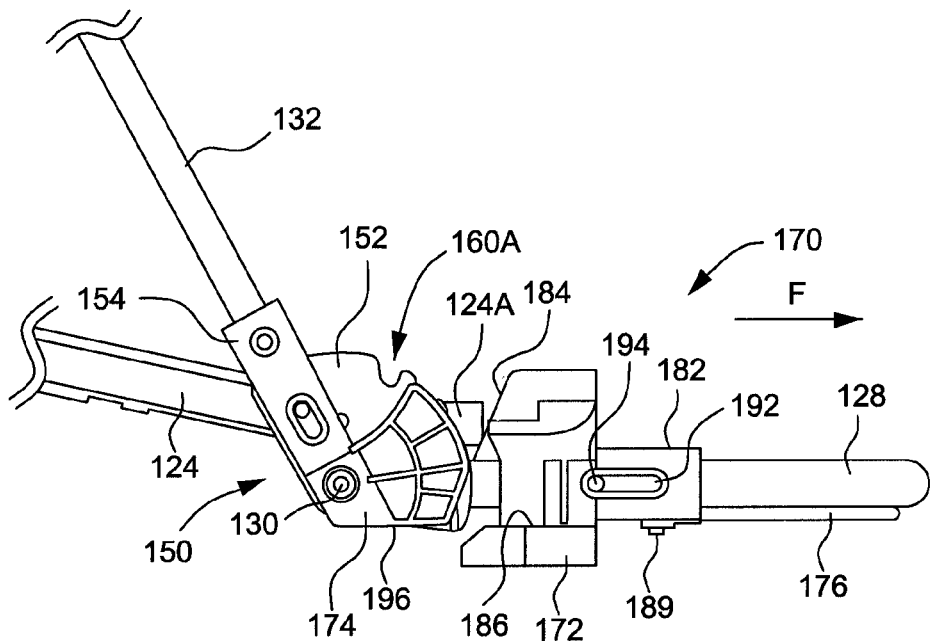
FIG. 5 is a schematic view illustrating an operation of the lock mechanism.
Figure 6:
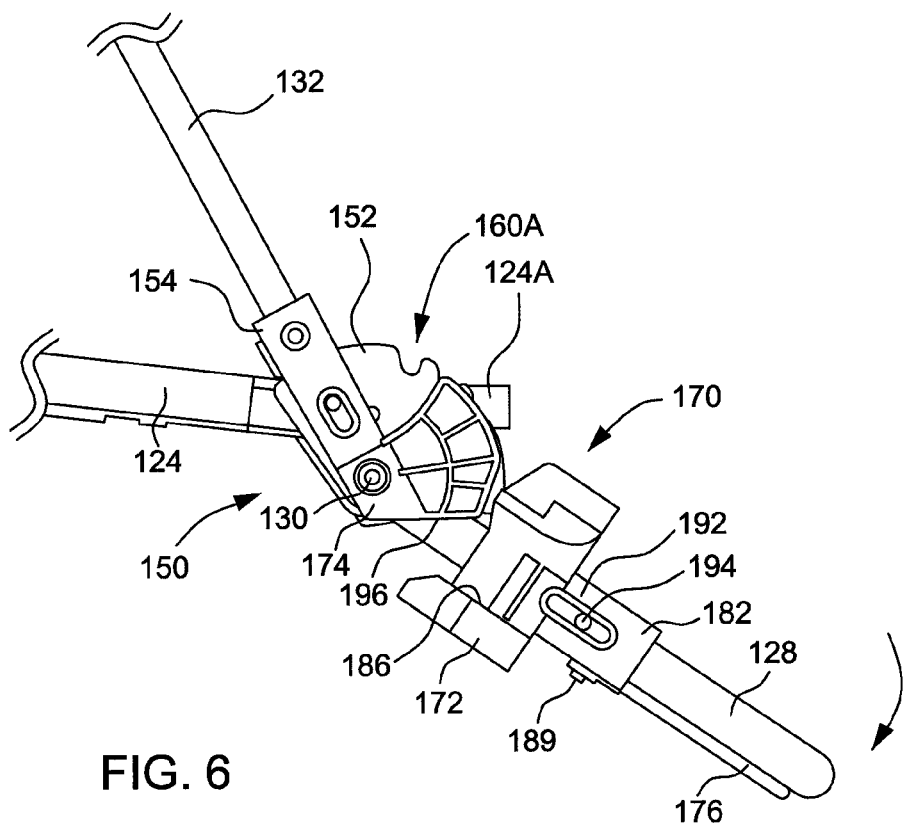
FIG. 6 is a schematic view illustrating an operation of a rear seat frame of the seat assembly.
Figure 7:
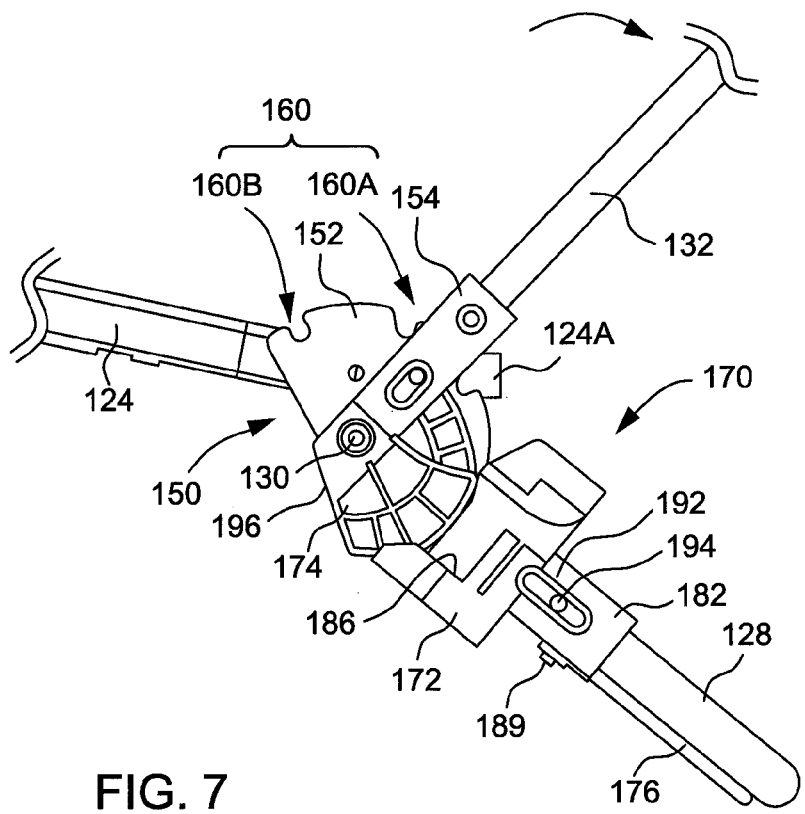
FIG. 7 is a schematic view illustrating the seat assembly and backrest in a forward configuration of use.

FIGS. 5, 6 and 7 are schematic views illustrating intermediary stages in the adjustment of the seat assembly 110 and backrest 112 to a forward configuration of use (i.e., a child can be seated facing the front of the child carrier apparatus 100). As shown in FIG. 5, the actuator handle 176 can be first operated to pull the locking element 172 along the direction F, whereby the rear end 124A of the front seat frame 124 and the interference element 174 respectively disengage from the restriction imposed by the second sleeve portion 184 and the abuttal surface 186 of the locking element 172.

Next referring to FIG. 6, the rear seat frame 128 can be rotated downward about the pivot axle 130 until a front end 128A of the rear seat frame 128 contacts with the rear end 124A of the front seat frame 124 (also shown in FIG. 4). The rear seat frame 128 and the rear seat 126 can be thereby disposed in a position inclined downward from a horizontal direction.

Referring to FIG. 7, the cable 156 then can be operatively drawn to disengage the keys 162 of the latch elements 154 from the second grooves 160B of the holder plates 152. Subsequently, the backrest frame 132 can be rotated about the pivot axle 130 toward the rear seat frame 128. Once the backrest frame 132 has reached the desired inclination, the spring element 164 can urge the latch elements 154 to move in a downward direction that causes each key 162 to engage with another groove of the holder plate 152 (e.g., the first groove 160A) for holding the backrest frame 132 inclined rearward. In this position, the backrest frame 132 and the front seat frame 124 define a space that can accept the placement of a child facing forward, whereas the rear seat frame 218 (and the rear seat 126 as shown in FIG. 2) being inclined downward from the horizontal direction cannot provide proper support for seating a child. Accordingly, when the seat assembly 110 and the backrest 112 are in the forward configuration of use, erroneous use of the rear seat 126 can be prevented in an effective manner.

In case a user wants to restore the rearward configuration of use, the latch elements 154 can be disengaged from the first grooves 160A, and the backrest frame 132 then can be rotated toward the front seat frame 124. Once the latch elements 154 have engaged with the second grooves 160B of the holder plates 152, the rear seat frame 128 can be rotated upward to recover its seating position (as shown in FIGS. 3 and 4). The second sleeve portion 184 and the abuttal surface 186 of the locking element 172 then can respectively engage with the rear end 124A of the front seat frame 124 and the interference element 174. Accordingly, the front seat 122 can be securely fastened with the rear seat 126, and the blocking contact between the locking element 172 and the interference element 174 can prevent rotation of the backrest 112.

Figure 8:
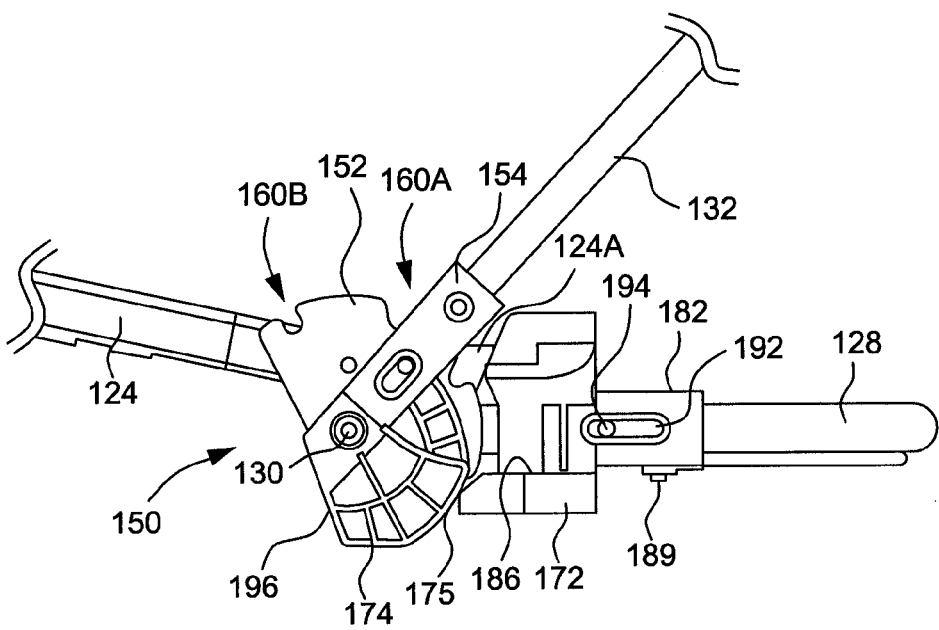
FIG. 8 is a schematic view illustrating an operation of the rear seat frame in the forward configuration of use.

Referring to FIG. 8, while the backrest frame 132 is positioned in the forward configuration of use (i.e., held via the first grooves 160A), any upward rotation of the rear seat frame 128 can cause an edge portion 175 of the interference element 174 to abut against the locking element 172. Owing to the obstruction of the interference element 174, the locking element 172 biased by the spring element 178 cannot move further forward for engaging with the rear end 124A of the front seat frame 124. In other words, in case the user wants to recover the rearward configuration of use, the backrest frame 132 must be first adjusted to the proper forward inclination for removing the obstruction caused by the interference element 174. Then only, the rear seat frame 128 can be turned to its seating position and locked with the front seat frame 124 via engagement between the locking element 172 and the rear end 124A of the front seat frame 124.

At least one advantage of the structures and methods described herein is the ability to provide a rotary rear seat, and a lock mechanism that can create selective interference between the rear seat and the backrest. Erroneous use of the rear and front seat can be thereby prevented effectively. As a result, the child carrier apparatus can be safer in use.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:
1. A child carrier apparatus comprising:
a support frame;

a seat assembly mounted on the support frame, wherein the seat assembly includes a front seat frame, and a rear seat frame operable to rotate about a pivot axle relative to the front seat frame; and a lock mechanism, including a locking element assembled with the rear seat frame and operable to move relative to the rear seat frame between a first and a second position, wherein the locking element when in the first position is configured to engage with a portion of the front seat frame for locking the front seat frame with the rear seat frame, and the locking element when in the second position is disengaged from the portion of the front seat frame, the rear seat frame being rotatable about the pivot axle to incline downward from a horizontal plane when the locking element is disengaged from the front seat frame.

2. The child carrier apparatus according to claim 1, wherein the locking element engages with the portion of the front seat frame when the child carrier apparatus is in a rearward configuration of use.

3. The child carrier apparatus according to claim 1, wherein the locking element is movably mounted with the rear seat frame.

4. The child carrier apparatus according to claim 3, wherein the locking element is assembled with a spring element operable to urge the locking element in engagement with the portion of the front seat frame.

5. The child carrier apparatus according to claim 1, further comprising a backrest.

6. The child carrier apparatus according to claim 5, wherein the lock mechanism further comprises an interference element connected with the backrest.

7. The child carrier apparatus according to claim 6, wherein the backrest is operable to rotate between a forward configuration of use and a rearward configuration of use.

8. The child carrier apparatus according to claim 7, wherein the interference element is in blocking contact with an abuttal surface of the locking element when the backrest is in the rearward configuration of use and the locking element engages with the portion of the front seat frame.

9. The child carrier apparatus according to claim 7, wherein the interference element is adapted to block engagement between the locking element and the portion of the front seat frame when the backrest is in the forward configuration of use.

10. The child carrier apparatus according to claim 7, wherein the backrest is operable to rotate about an axis defined by the pivot axle.

11. The child carrier apparatus according to claim 5, further comprising a position adjustment device operable to hold the backrest in position in either of a forward and a rearward configuration of use.

12. The child carrier apparatus according to claim 11, wherein the backrest comprises a backrest frame, and the position adjustment device comprises:
a holder plate affixed with the front seat frame; and
a latch element movably assembled with the backrest frame.

13. The child carrier apparatus according to claim 12, wherein the latch element is operable to engage with either one of a first and second groove provided in the holder plate when the backrest is respectively in either of the forward and rearward configuration of use.

14. The child carrier apparatus according to claim 1, wherein the front and rear seat frames include tubular structures.

15. A method of operating a child carrier apparatus, wherein the child carrier apparatus comprises a support frame, a backrest, a seat assembly having a front seat and a rear seat operable to rotate about a pivot axle relative to the front seat, a movable locking element, and an interference element connected with the backrest, the method comprising:
rotating the backrest to a position inclined toward the front seat;
rotating the rear seat about the pivot axle to a seating position adapted to receive a sitting child facing a rear of the child carrier apparatus; and
driving the locking element in movement to engage with a portion of the front seat for locking the front seat with the rear seat in a rearward configuration of use; and
when the locking element engages with the portion of the front seat causing the interference element to be in blocking contact against an abuttal surface of the locking element.

16. The method according to claim 15, further comprising:
causing the locking element to disengage from the portion of the front seat;
rotating the rear seat about the pivot axle away from the seating position; and
rotating the backrest toward the rear seat, whereby the child carrier apparatus is converted from the rearward configuration of use to a forward configuration of use, the rear seat being in a position inclined downward when the child carrier apparatus is in the forward configuration of use.

17. A child carrier apparatus comprising:
a support frame;
a seat assembly mounted on the support frame, wherein the seat assembly includes a front seat frame, and a rear seat frame operable to rotate about a pivot axle relative to the front seat frame;
a backrest operable to rotate between a forward configuration of use and a rearward configuration of use; and
a lock mechanism including:
an interference element connected with the backrest; and
a locking element assembled with the rear seat frame and operable to move relative to the rear seat frame for locking and unlocking the front seat frame with respect to the rear seat frame;
wherein the interference element is adapted to block engagement between the locking element and a portion of the front seat frame when the backrest is in the forward configuration of use.

18. The child carrier apparatus according to claim 17, wherein the interference element is in blocking contact with an abuttal surface of the locking element when the backrest is in the rearward configuration of use and the locking element engages with the portion of the front seat frame.

* * * * *